US010604935B1

(12) United States Patent
Forgue (10) Patent No.: US 10,604,935 B1
(45) Date of Patent: Mar. 31, 2020

(54) MAGNETIC SUPPORT CLIP (71) Applicant: Erik Forgue, Little Elm, TX (US)

(72) Inventor: Erik Forgue, Little Elm, TX (US)

(*) Notice: Subject to any disclaimer, the term of this patent is extended or adjusted under 35 U.S.C. 154(b) by 0 days.

(21) Appl. No.: 16/675,407

(22) Filed: Nov. 6, 2019

Related U.S. Application Data (60) Provisional application No. 62/769,445, filed on Nov. 19, 2018.

(51) Int. Cl.
| E04D 13/00 | (2006.01) |
| F16B 1/00 | (2006.01) |
| F16B 2/10 | (2006.01) |
| F21V 21/088 | (2006.01) |
| F21V 21/096 | (2006.01) |
| F16M 13/02 | (2006.01) |
| F21W 121/00 | (2006.01) |

(52) U.S. Cl.
CPC .............. *E04D 13/00* (2013.01); *F16B 1/00* (2013.01); *F16B 2/10* (2013.01); *F16M 13/022* (2013.01); *F21V 21/088* (2013.01); *F21V 21/096* (2013.01); *F16B 2001/0035* (2013.01); *F21W 2121/004* (2013.01)

(58) Field of Classification Search
CPC ...... F21S 4/10; F21V 21/088; F21V 21/0885; F21W 2121/004
See application file for complete search history.

(56) References Cited

U.S. PATENT DOCUMENTS

| 3,193,229 | A | * | 7/1965 | Stock | F21V 21/088 248/74.2 |
| 3,599,916 | A | * | 8/1971 | Szabo | F16L 3/24 248/73 |
| 4,399,498 | A | * | 8/1983 | Bacevius | F21L 15/14 362/190 |
| 5,607,230 | A | | 3/1997 | Protz, Jr. | |
| 5,609,415 | A | * | 3/1997 | Protz, Jr. | F21V 21/08 248/229.16 |
| 6,536,727 | B1 | * | 3/2003 | Limber | F16B 2/22 248/227.1 |
| 6,685,151 | B2 | * | 2/2004 | Vasquez | F21V 21/088 248/227.1 |
| 6,792,653 | B2 | * | 9/2004 | Protz | A47G 33/10 24/343 |
| 6,883,768 | B1 | * | 4/2005 | Morin | A47G 33/0845 248/339 |

(Continued)

Primary Examiner — Bradley Duckworth
(74) Attorney, Agent, or Firm — Hilton IP Law, PLLC; Zachary W. Hilton (57) ABSTRACT A magnetic support clip for supporting decorative lighting and other objects adjacent to gutters, roof eaves, and other structures of homes and other buildings. The support clip includes a proximal portion and a distal portion which are rotatably attached to one another via hinge-like structures that permit the clip portions to rotate about the hinge axis, providing the capability of the clip to operate in an open mode of operation during the installation and removal of the clip, and in a closed mode of operation when the clip is mounted to a gutter. Magnets embedded in lower portions of both of the clip portions are configured to be aligned when mounted onto a gutter and placed by a user into a closed mode of operation. The embedded magnets, having a gutter wall in between, provide an attractive magnetic force to further secure the clip to the gutter.

18 Claims, 9 Drawing Sheets (56) References Cited

U.S. PATENT DOCUMENTS

| | | | |
|---|---|---|---|
| 8,545,041 B2 * | 10/2013 | Brown | A42B 1/24 |
| | | | 24/336 |
| 8,840,264 B2 * | 9/2014 | Molina | F21V 21/088 |
| | | | 362/109 |
| 8,888,337 B2 | 11/2014 | Adams, IV | |
| 9,161,586 B2 * | 10/2015 | Brown | A42B 1/24 |
| 9,289,052 B2 * | 3/2016 | Griffith | A45F 5/06 |
| 9,630,769 B2 * | 4/2017 | Schultz | B65D 85/42 |
| 9,702,503 B2 * | 7/2017 | Chi Man | F16M 13/022 |
| 9,964,291 B1 | 5/2018 | Rio | |
| 10,180,242 B2 * | 1/2019 | Schreiber | F21V 21/088 |
| 10,397,383 B2 * | 8/2019 | Duffy | H04B 1/3888 |
| 10,539,267 B2 * | 1/2020 | Olsen | F21S 4/10 |
| 2004/0129846 A1 * | 7/2004 | Adams | F21V 21/088 |
| | | | 248/231.81 |
| 2009/0185370 A1 | 7/2009 | Moore | |
| 2016/0327262 A1 * | 11/2016 | Harris | F21V 35/00 |
| 2018/0017240 A1 | 1/2018 | Schreiber et al. | |
| 2018/0320868 A1 * | 11/2018 | Chang | F21V 21/088 |
| 2019/0011078 A1 * | 1/2019 | Olsen | F21V 21/088 |
| 2019/0257502 A1 * | 8/2019 | Felt | F21V 21/088 |

* cited by examiner

MAGNETIC SUPPORT CLIP

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Technical Field

The present invention relates generally to clips and, more specifically, to clips for supporting decorative lighting and other objects, such clips utilizing magnetic attraction to enhance the securing of the clips on gutters and other structures of buildings.

Description of Related Art

Each year, millions of people desire to install decorative lighting (sometime referred to colloquially as "Christmas lights" or "holiday lights") around their respective homes. The process of installing decorative lighting is very labor intensive and can be dangerous, especially for people with limited mobility who often cannot participate in the display of decorative lighting unless they are willing to pay for professional installation. Installing decorative lighting typically involves climbing a ladder to near the edge of a roof or gutter, and drilling hooks into roof eaves, or mounting flimsy plastic clips onto the gutters. Such hooks typically stay up all year and are considered an eyesore, decreasing home value. Prior art clips for mounting onto gutters are difficult to install and often are poorly secured to gutters. Next, the decorative lighting must be hung into the hooks or clips, all while the installer is balancing on a ladder. The installer must repeatedly ascend and descend the ladder to install the hooks/clips and to hang the decorative lighting along the length of the roof on which the lighting is to be installed. This is extremely burdensome for many people that can handle such physical exertion and makes installing decorative lighting for many others with limitations to their mobility an impossibility. For others, even if they are physically capable of installing the decorative lighting, the burden and danger associated with ascending and descending a ladder to rooftop heights makes the process of installing and removing decorative lighting unattractive.

What is needed is a clip for supporting decorative lighting and other objects that is easily mountable on a roof, gutter, or other structure of a building. Specifically, what is needed is a clip that can be mounted onto a gutter or roof by a user without the need for a ladder, and likewise can be easily removed from the gutter or roof without the need for a ladder. What is also needed is a clip that can be securely attached to the gutter or roof, but which can still be easily removed. What is further needed is an apparatus that is configured to facilitate the mounting and removal of a clip from a roof or gutter by a user without the need for a ladder. What is further needed is device that is configured to facilitate the mounting and removal of decorative lighting and other objects to/from a clip by a user without the need for a ladder. These and other needs are met by the embodiments of the magnetic support clips, clip mounting and removal apparatus, and lighting mounting and removal device described below with reference to the accompanying drawings.

BRIEF DESCRIPTION OF THE SEVERAL VIEWS OF THE DRAWINGS

The inventions will be more fully understood by reference to the following detailed description of the preferred and alternate embodiments when read in conjunction with the accompanying drawings, wherein.

The above figures are provided for the purpose of illustration and description only, and are not intended to define the limits of the disclosed invention. Use of the same reference number in multiple figures is intended to designate the same or similar parts. Furthermore, if and when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF EMBODIMENTS OF THE INVENTION

Several exemplary embodiments of the claimed invention(s) will now be described with reference to the drawings. Unless otherwise noted, like elements will be identified by identical numbers throughout all figures. The invention(s) illustratively disclosed herein suitably may be practiced in the absence of any element that is not specifically disclosed herein.

Magnetic support clips for mounting on a gutter, adjacent to a roof or eaves, or other building structures, and intended for use in supporting decorative lighting and/or other items on a home or commercial building for display or use, are disclosed herein. It should be noted that while the exemplary embodiments of the inventions as described herein are associated with the support and display of decorative lighting, the magnetic support clips taught herein could also be equally utilized in connection with supporting other types of objects such as, for example, supporting wiring associated with outdoor speakers, wiring or cables associated with home/commercial security systems, and supporting all manner of other types of objects such as, for example, potted plants, security cameras, and signage. Indeed, it is contemplated that the inventions taught herein could be utilized in connection with mounting and support of all manner of objects on a gutter, roof, or any other structure on which the support clips may be mounted.

Figure 1:
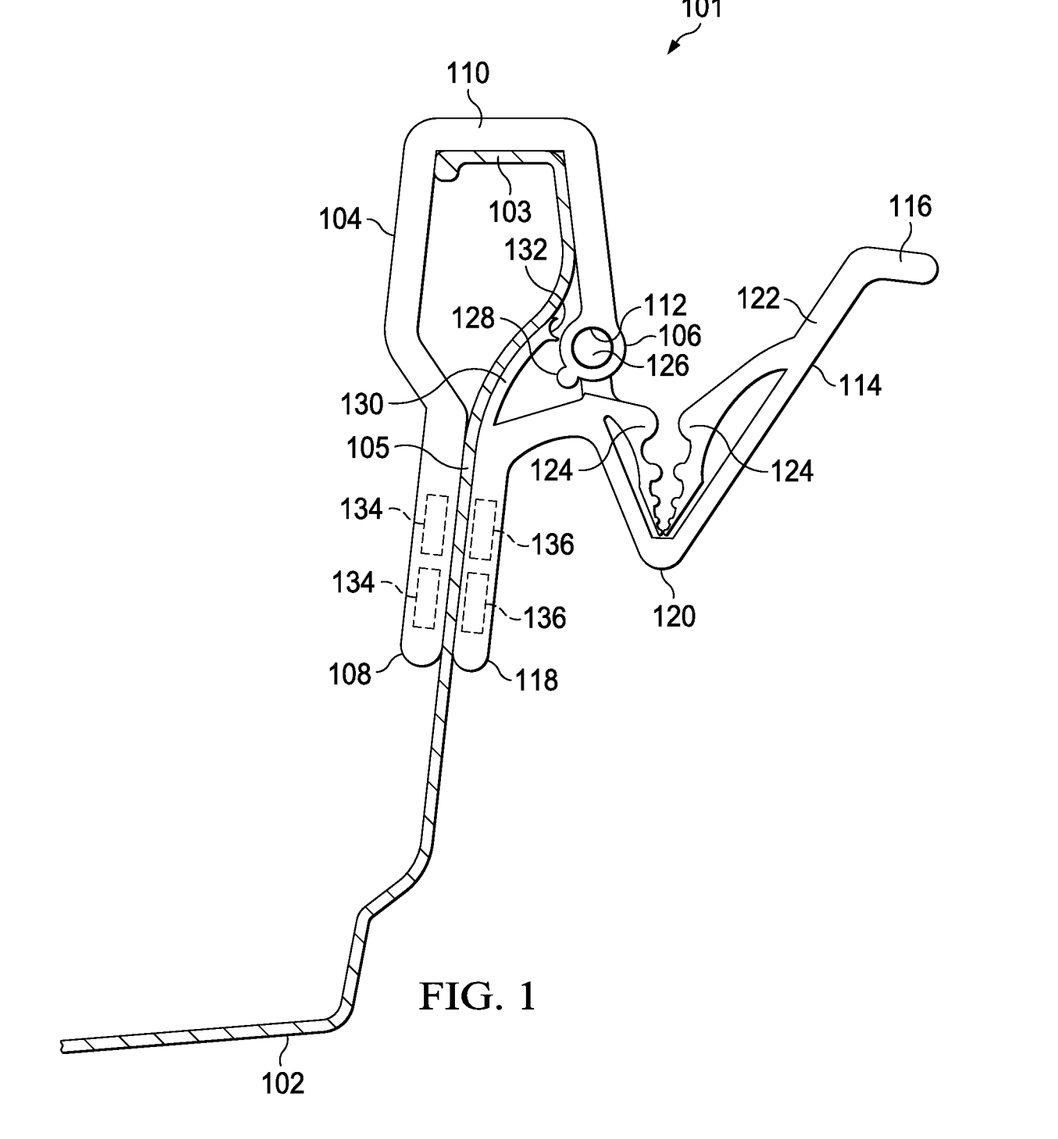
FIG. 1 is a cross-sectional view of an embodiment of a magnetic support clip mounted to a gutter and depicted in a closed mode of operation.

Referring now to FIG. 1, a cross-sectional view of an embodiment of a magnetic support clip (101) mounted to a home gutter and depicted in a closed mode of operation is shown. In one embodiment, the magnetic support clip comprises a distal portion (104) and proximal portion (114), the distal portion having a first elongate shaft, and the proximal portion having a second elongate shaft. It should be note that the terms "distal" and "proximal" are used herein to refer to the clip portions' general respective positions in relation to a user that would typically mount such a clip. The proximal portion (114) is thus generally positioned more proximal to a user and generally more distal to a gutter (102) upon which the clip is intended for mounting. Conversely, the distal portion (104) of the clip (101) is generally positioned more distal from a user and more proximal to the gutter (102). However, it is easily apparent from viewing FIG. 1 and other figures disclosed herein that portions of the distal portion (104) of the clip are in fact more proximal to a user, at least in certain modes of use, than are certain portions of the proximal portion (114) of the clip. Nevertheless, the terms "proximal" and "distal" are used herein to generally refer to the overall position of the respective portions of the clips, but not to imply that all parts of such respective portions are proximal or distal to one another. It should be noted that although a cross-sectional view of an embodiment of the clip is shown in FIG. 1, the connecting protrusions (140, 142) depicted in FIG. 2 have been intentionally omitted from the drawing to better illustrate the aspects of the clip discussed below with respect to FIG. 1.

Still referring to FIG. 1, the distal portion (104) of the magnetic support clip (101) depicted generally comprises of an elongate shaft, which in one embodiment has a generally rectangular cross-section, said shaft having a lower first end (108) configured to bear against an inner wall of a gutter (105) when the clip is mounted thereto, a curved downwardly (upper curved portion with opening downwardly oriented) facing top section (110) having a substantially horizontal and linear segment on its inside surface for resting on the substantially flat exterior top of the gutter (103) to which the clip is mounted, and an upper second end (106) having a hollow circular portion (112) that acts as a hinge knuckle through which a pin (126) formed on the proximal portion (114) of the clip rotates to open and close the magnetic support clip. The pin (126) and the hollow circular portion (112) work similar to a hinge and form a pivot point by which the proximal portion and the distal portion of the support clip may rotate with respect to one another. In this manner, the proximal portion of the clip is rotatably attached or rotatably fastened to the distal portion of the clip. The embodiment of the magnetic support clip depicted in FIG. 1 is shown in a closed mode of operation—that is, the clip is mounted to a gutter (102) and, as discussed in further detail below, the lower end (118) of the proximal portion of the clip is adjacent to the lower end (108) of the distal portion of the clip, the two lower ends having a gutter wall separating them but in close enough proximity to one another that magnets (134, 136) embedded or otherwise attached to the respective lower ends of the clips are aligned and experience an attractive force that works to attract the respective lower ends of the clips to one another, thereby further securing the clip on the gutter to which it is mounted. Such an embodiment of the magnetic support clip can also be more generally described, with reference to FIG. 1, as including a distal clip portion (104) having a first elongate shaft with a curved section that is downwardly facing (110), one or more first magnets (134) affixed to said distal clip portion; a proximal clip portion (114) having a second elongate shaft with a curved section that is upwardly facing (120) (lower curved portion with opening upwardly oriented), one or more second magnets (136) affixed to said proximal clip portion; wherein said distal clip portion and said proximal clip portion are rotatably fastened to one another (112, 126), allowing said distal clip portion and said proximal clip portion of said support clip to rotate with respect to one another such that in a closed mode of operation of said support clip, said one or more first magnets are in alignment with said one or more second magnets (134, 136).

Still referring to FIG. 1, in one embodiment of the lower first end (108) of the distal portion of the clip, an adjacent substantially linear portion of the clip shaft has one or more magnets (134) embedded into the shaft, such portion of the shaft having cavities (shown in FIG. 2) sized and shaped to receive correspondingly sized and shaped magnets. The placement of such cavities and magnets corresponds to the placement of similar one or more magnets (136) embedded in a substantially linear portion of the clip shaft adjacent to a lower first end (118) of the proximal portion (114) of the magnetic support clip. Ideally, the magnets (134) on the distal portion of the clip are embedded in the shaft in a position so that they are substantially aligned with the magnets (136) embedded in the shaft of the proximal portion of the clip, thereby enhancing the attractive force between the clips so as to better secure the clip to the gutter on which the clip is mounted. When aligned, the magnets are roughly opposite another (with the gutter wall in between the clip portions in which the magnets are embedded) when the clip is in a closed mode of operation. It should be noted that while it is contemplated that the aforementioned one or more magnets are embedded in a substantially linear section of the respective clip shafts adjacent to the lower ends of such shafts, other alternate embodiments of the clip may be configured such that the magnets are embedded or otherwise placed at other portions of the clip shafts that may or may not be substantially linear. Also, and as discussed further below, it is further contemplated that in other alternate embodiments of the clip, magnets may be affixed or otherwise attached to the surface of the clip shafts, or even partially embedded in the clip shafts such that one side of the respective magnets is exposed, rather than being fully embedded in the clip shafts as in the embodiment of the clip depicted in FIG. 1. In one alternate embodiment, the one or more magnets may be attached to the clip shafts with an adhesive. In other alternate embodiments, one or both of the lower ends (or other portions of the clip shafts) may be constructed of materials having magnetic qualities such that the lower ends attract one another, thereby assisting in securing the clip to the gutter upon which the clip is mounted. For example, in one alternate embodiment, one of either the lower end of the proximal portion or the lower end of the distal portion may be constructed of a ferrous metal having magnetic properties but not having magnets affixed to such end, while the other of the lower end of the proximal portion or the lower end of the distal portion may have one or more magnets affixed thereto, said magnets being attracted to said ferrous metal having magnetic properties.

In one embodiment, the magnetic support clip may be constructed from rigid or semi-flexible polymers such as, for example, high-density polyethylene (HDPE). However, it is contemplated that other types of polymers (for example, thermoplastics such as acrylonitrile butadiene styrene (ABS) suitable for use in conjunction with 3D printing machines), metals (for example, aluminum), metal alloys, and even organic materials (for example, wood) may be utilized to construct the magnetic support clip. Such various materials having sufficient rigidity to support the wiring/cabling which it is intended to support may all be utilized. Further, in some alternate embodiments, it is contemplated that all or a portion of the distal portion of the magnetic support clip may be constructed of a flexible material configured to easily conform around objects such as gutters. For example, in one alternate embodiment, a middle portion of the distal portion of the clip may be constructed of a flexible wire embedded in a rubber or polymer sheath, such middle portion being capable of conforming around the top of the gutter, thereby allowing such alternate embodiment clips to be mounted on gutters having variously shaped structures. As noted above, the shafts of the clips depicted here are generally rectangular in the cross-section, which is more easily observed with reference to FIGS. 2 and 3, but it is contemplated that the shafts of alternate embodiment clips may be shaped differently (for example, shafts having trapezoidal cross-sections) and also be configured such that certain portions of the clip shafts may have one shape, while other portions of the clip shafts may be configured to have another shape.

Still referring to FIG. 1, in one embodiment a curved top section (110) of the distal portion of the magnetic support clip has a substantially horizontal segment of the inside surface of said top section is configured to rest on the substantially flat top of the gutter (103) to which the clip is mounted. In the embodiment of the clip shown in FIG. 1, the top section of the distal portion of the clip is shaped similar to an upside down letter "U" or a trapezoid having the more narrow side resting on the top of the gutter, while an open-ended wider portion extends downwards towards the lower portions of the two respective ends (108, 106) of the clips. However, it is contemplated that the top section of the clip may be shaped in alternate embodiments other than what is depicted in the drawings shown herein, but which is still generally curved or non-linear in shape, having a portion of said downwardly facing top section of the clip that is configured to rest on and wrap around the top of the gutter (103).

In other alternate embodiments of the magnetic support clip, the top section of the distal portion of the clip that is configured to rest on the top of the gutter may instead be a part of the proximal portion of the clip with a pivot point connecting the distal and proximal portions of the clips being located adjacent to the distal end of the top of the gutter. Likewise, in other alternate embodiments of the magnetic support clip, the top section of the distal portion of the clip that is configured to rest on the top of the gutter may instead be a part of the distal portion of the clip, but with a pivot point connecting the distal and proximal portions of the clips being located adjacent to the proximal end of the top of the gutter.

Figure 3:
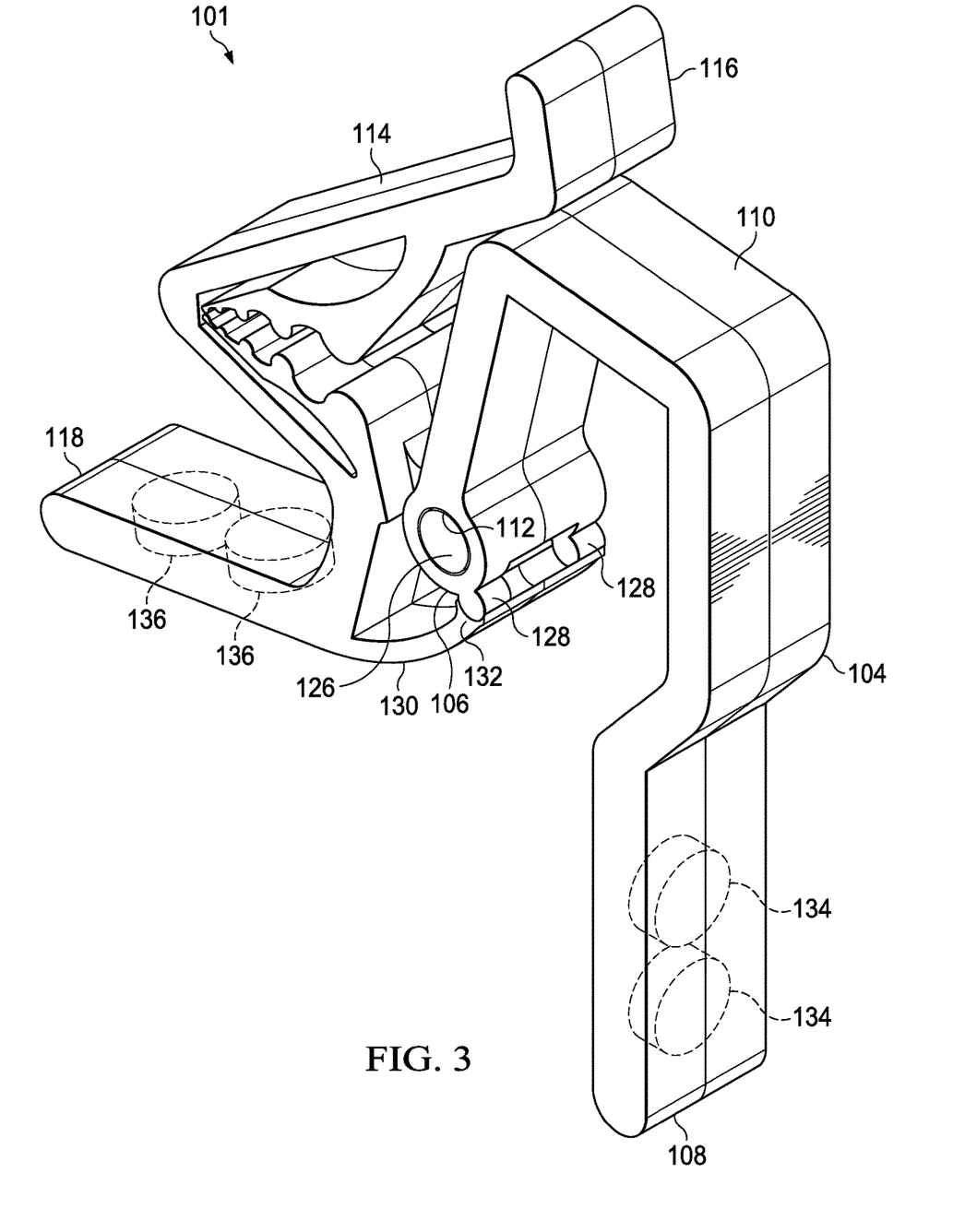
FIG. 3 is a perspective view of the embodiment of the magnetic support clip as depicted in FIG. 1, said clip being depicted in an open mode of operation.

Still referring to FIG. 1, an upper second end (106) of the distal portion of the magnetic support clip has a hollow circular portion (112) that acts as a hinge knuckle through which a pin (126) formed on the proximal portion (114) of the clip rotates to open and close the magnetic support clip, thereby forming a pivot point between the distal and proximal clip portions. In the embodiment depicted in FIG. 1, the pin (126) is attached to the proximal portion of the magnetic support clip between a lower first end (118) and an upper second end (116). As depicted in FIG. 3, the proximal portion of the clip is configured to rotate via the pin (126) around the circular hollow portion (112) of the second upper end of the distal portion of the clip (114), allowing the clip with the assistance of a user to transition from an open to a closed (and vice versa) mode of operation. In a closed mode of operation as depicted in FIG. 1, the magnets embedded in the respective clip shafts attract one another, further securing the clip to the gutter. In an open mode of operation, as depicted in FIG. 3, the magnets embedded or otherwise attached to the clip shafts are separated such that little to no attractive force between the magnets will be noticed by a user. While the rotational fastening configuration involving a pin mated to a hollow knuckle portion is depicted in the drawings herein, it is contemplated that other types of configurations providing for the clip shafts to rotate or otherwise pivot about one another may be utilized in connection with the magnetic support clips.

Still referring to FIG. 1, an arm (130) having an arched end (132) extends from the proximal portion of the clip shaft such that when the lower first end (118) of the proximal portion of the clip transitions to an open mode of operation, the arched end (132) mates with a rounded protrusion (128) formed adjacent to the second upper end (106) of the distal portion of the clip as is depicted in FIG. 3. This aforementioned mating of the arched end (132) to the rounded protrusion (128) works to at least temporarily arrest the rotational motion of the respective proximal and distal clip portions with respect to one another. In this manner, a user can prevent the clip from inadvertently transitioning to a close mode of operation that would otherwise delay the installation process—in other words this mating that arrests the rotation of the clip portions prevents the magnets from inadvertently causing the lower ends of the clips from abutting one another and prematurely forcing the clip closed. This is an advantage when a user is mounting the clips to gutters using an extended pole of the type described below, and does not want the clip to prematurely or inadvertently close before the clip is on top of the gutter. The arched end and the rounded protrusion are sized and shaped for such structures to mate to one another and prevent unwanted rotation of the clip portions, but also allowing a user to disengage the structures (arched end and rounded protrusion) to once again allow for rotation of the clip portions.

While rotational movement of the clip portions is arrested (with respect to one another) via the arched arm end and rounded protrusion structures described herein with respect to at least one embodiment of the magnetic support clip, it is contemplated that other alternate embodiments of the magnetic support clip may utilize alternate structures to arrest such rotational movement and maintain the clip in an open mode of operation as long as desired. For example, in an alternate embodiment of the magnetic support clip, a spring attached to one or more of the clip portions may provide a distally directed biasing force to separate the lower end of the clip portions (such biasing force able to be overcome by the magnetic attractive forces of the magnets when they are in close proximity).

Still referring to FIG. 1, in one embodiment, approximately the upper half of the proximal portion (114) of the clip comprises an upwardly facing "V" shaped wire receiving portion (120), having an upwardly facing notched or curved portion configured to receive and hold one or more wires/cables of electrical decorative lighting. It is intended that a plurality of the two-piece clips of the present invention may be mounted to the gutter(s) of a home or other building, and decorative lighting may be supported by such clips so that they may be displayed. However, as noted above, all manner of objects other than decorative lighting may be supported in the notched or curved portion (120) of the clip. In one embodiment, the upper side of the notched or curved portion of the shaft of the proximal portion of the clip may have a ridged or jagged exterior surface configured to prevent a wire or other object from being easily or inadvertently dislodged from the proximal portion of the clip on which it is mounted. In one embodiment, the second upper end (116) of the proximal portion of the clip may have a flat exterior surface and be substantially linear to provide a structure on which a clip mounting and removal apparatus (see FIG. 7) may engage. In one embodiment, said second upper end of said proximal portion of said support clip includes a segment of said elongate shaft that is linear in form for a length of at least 0.5 inches. In one embodiment, a support clip (101) comprising a distal clip portion (104) having a first elongate shaft with a curved top portion (110) formed between a first lower end (108) of said distal clip portion extending downward from a distal end of said curved top portion (110), and a second upper end (106) of said distal clip portion extending downward from a proximal end of said curved top portion (110), said first lower end (108) having one or more first magnets (134) affixed adjacent thereto; a proximal clip portion (114) having a second elongate shaft with a first lower end (118), a second upper end (116), and an upwardly facing notch (120) formed between said first lower end of said proximal clip portion and said second upper end of said proximal clip portion, said first lower end (118) of said proximal clip portion having one or more second magnets (136) affixed thereto; wherein said distal clip portion and said proximal clip portion are rotatably fastened (112, 126) to one another, allowing said proximal portion of said support clip and said distal portion of said support clip to rotate with respect to one another such that in a closed mode of operation, said one or more first magnets (134) are in alignment with said one or more second magnets (136).

Figure 2:
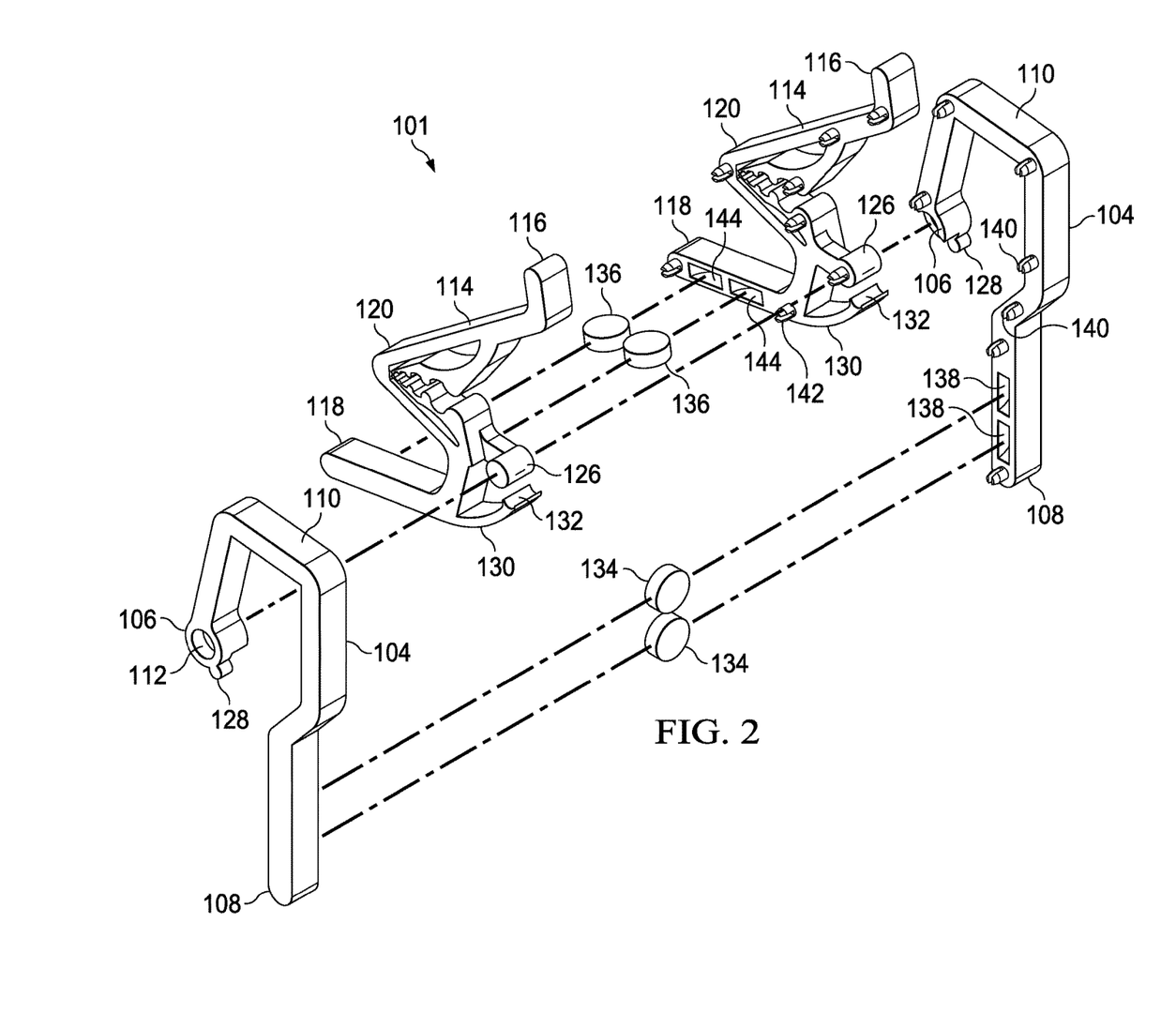
FIG. 2 is an exploded perspective view of the embodiment of the magnetic support clip as depicted in FIG. 1.

Referring to FIG. 2, an exploded perspective view of the embodiment of the magnetic support clip as depicted in FIG. 1 is shown. In one embodiment, each of the distal portion (104) of the clip and the proximal portion (114) of the clip are constructed in two halves as depicted in FIG. 2, such halves being configured to connect to a corresponding half of the clip. Connecting protrusions (140, 142) formed on one half of each respective clip portion are sized and shaped to mate with holes (not shown) formed on the corresponding half of the clip portion, thereby attaching the respective clip portions to one another. In this manner of construction, one or more magnets (134, 136) may be relatively easily embedded in correspondingly shaped and sized cavities (138, 144) in the respective clip shafts. Although not visible in FIG. 2, it is contemplated that the other half of the cavities (138, 144) are formed on the other respective halves of the clips. This manner of constructing and joining the respective clip halves also permits for the mating of the pin (126) with the hollow knuckle portion (112), which together form a hinge to provide for the rotatable attachment of the proximal portion of the clip to the distal portion of the clip, and also allow the clip portions when attached to rotate or pivot with respect to one another (allowing for the clip to have an open mode of operation and a closed mode of operation). It should be noted that while the rotational attachment (elsewhere described as being rotatably fastened) of the clip portions is described in one embodiment as utilizing hinge-like structures (pin rotating within a hollow knuckle portion), other alternate embodiments of the magnetic support clip may utilize other means of rotational attachment. In other alternate embodiments, the magnetic support clip could even comprise a single integrated shaft having rigid or semi-rigid sections for supporting the clip on a gutter and supporting decorative lighting, and also having one or more flexible sections of the shaft that permit rotation to provide for rotational movement of the clip from open and close modes of operation. In one such alternate embodiment, such flexible sections may be constructed of a shape memory alloy such as Nitinol that may be "trained" to apply a biasing force keep the clip in an open mode of configuration, but allowing the clip to flex to a closed mode of operation when a closing force is applied by a user (the aligned magnets maintaining the closed mode of operation until forced open). While the manufacturing of the clips in halves, via injection molding or 3D printing for example, is one manner in which the clips may be manufactured, it is contemplated that other means for manufacturing the clip structures may be utilized as will be understood by those of skill in the art.

Referring now to FIG. 3, a perspective view of the embodiment of the magnetic support clip as depicted in FIG. 1, said clip being depicted in an open mode of operation is shown. In the open mode of operation, the first lower end (118) of the proximal portion (114) of the clip (101) is rotated away from the first lower end (108) of the distal portion (104) of the clip (101) to allow the magnetic support clip to be opened for mounting on a gutter as depicted in FIG. 1, or to be removed from a gutter. When the two lower ends (118, 108) of the clip portions are rotated about the pivot point formed by the pin (126) mated to the hollow knuckle portion (112), the arched end (132) of the arm (130) mates to the rounded one or more protrusions (128) formed on the upper second end (106) of the proximal portion of the clip, and such mating at least temporarily arrests further rotational movement as between the proximal and distal portions of the clips. As discussed above, by rotating the clips to allow for such mating between the arched end and the rounded protrusion, a user can prevent the clip from inadvertently transitioning to a close mode of operation before such movement is desired. Namely, prior to mounting the magnetic support clip onto a gutter.

Figure 4:
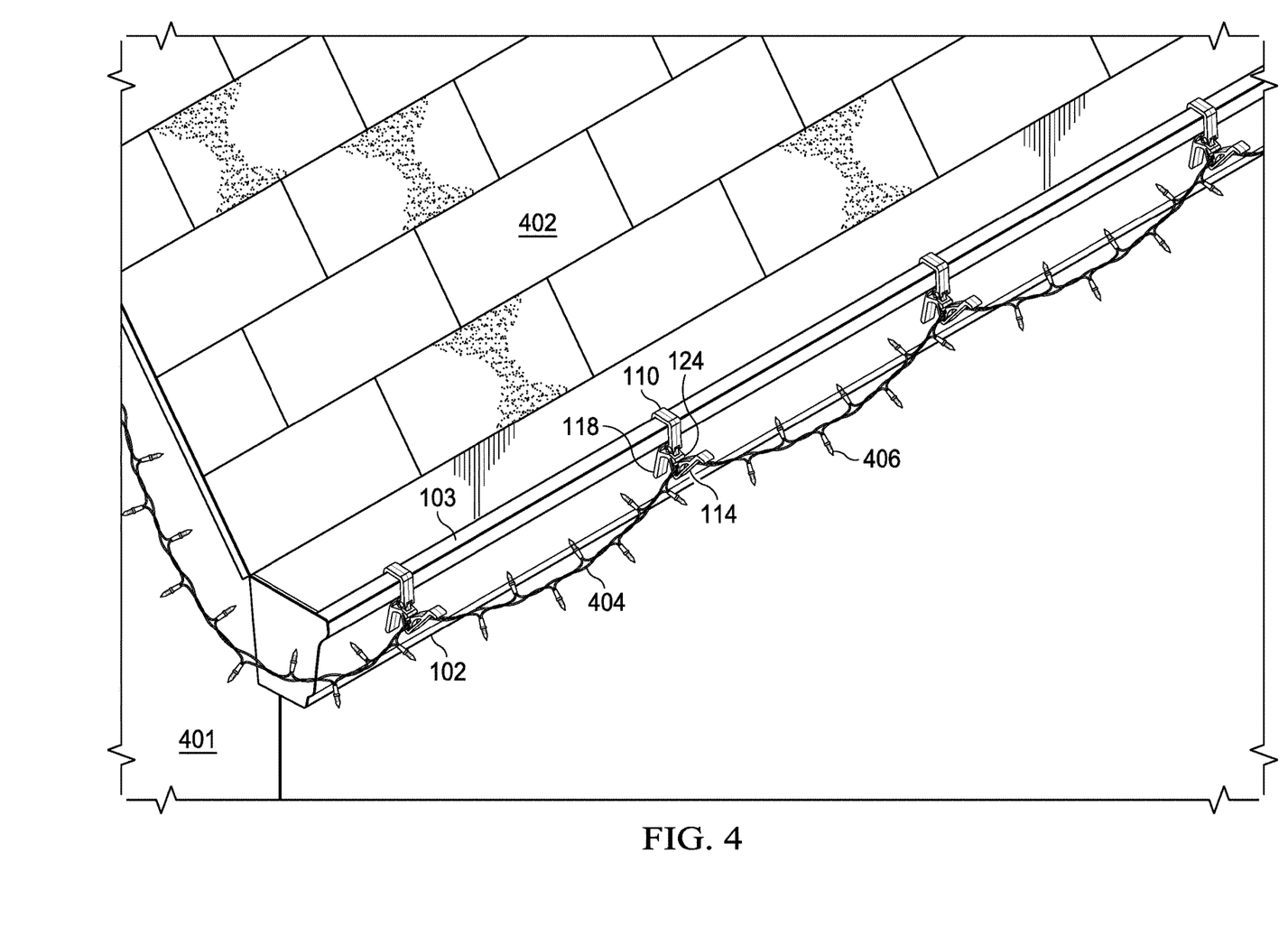
FIG. 4 is a perspective view of a plurality of embodiments of the magnetic support clip as depicted in FIG. 1, mounted to the gutter of a house and supporting a string of decorative lights.

Referring to now FIG. 4, a perspective view of a plurality of embodiments of the magnetic support clip (as depicted in FIG. 1), mounted to the gutter (102) of a house (401) and supporting a string (404) of decorative lights (406) is shown. Each magnetic support clip is mounted to the gutter such that the curved top section (110) of the distal portion of the clip wraps over the top of the gutter with the remaining lower first end (not visible) extending downward until it bears against the inner gutter wall as depicted in FIG. 1. The section of the proximal portion of the clip adjacent to the first lower end (118) likewise bears against the outer gutter wall, with the aligned magnets embedded in the clip shafts adjacent to such lower ends, providing an attractive magnetic force that further assists the clip in being secured to the gutter. An upwardly facing curved or notched "V" shaped portion of the proximal portion of the clip provides a secure location on which the string/wire may rest. Users of the magnetic support clip will take into account the weight of the decorative lighting in determining how many magnetic support clips to use, and the spacing to provide between such mounted clips.

Figure 5:
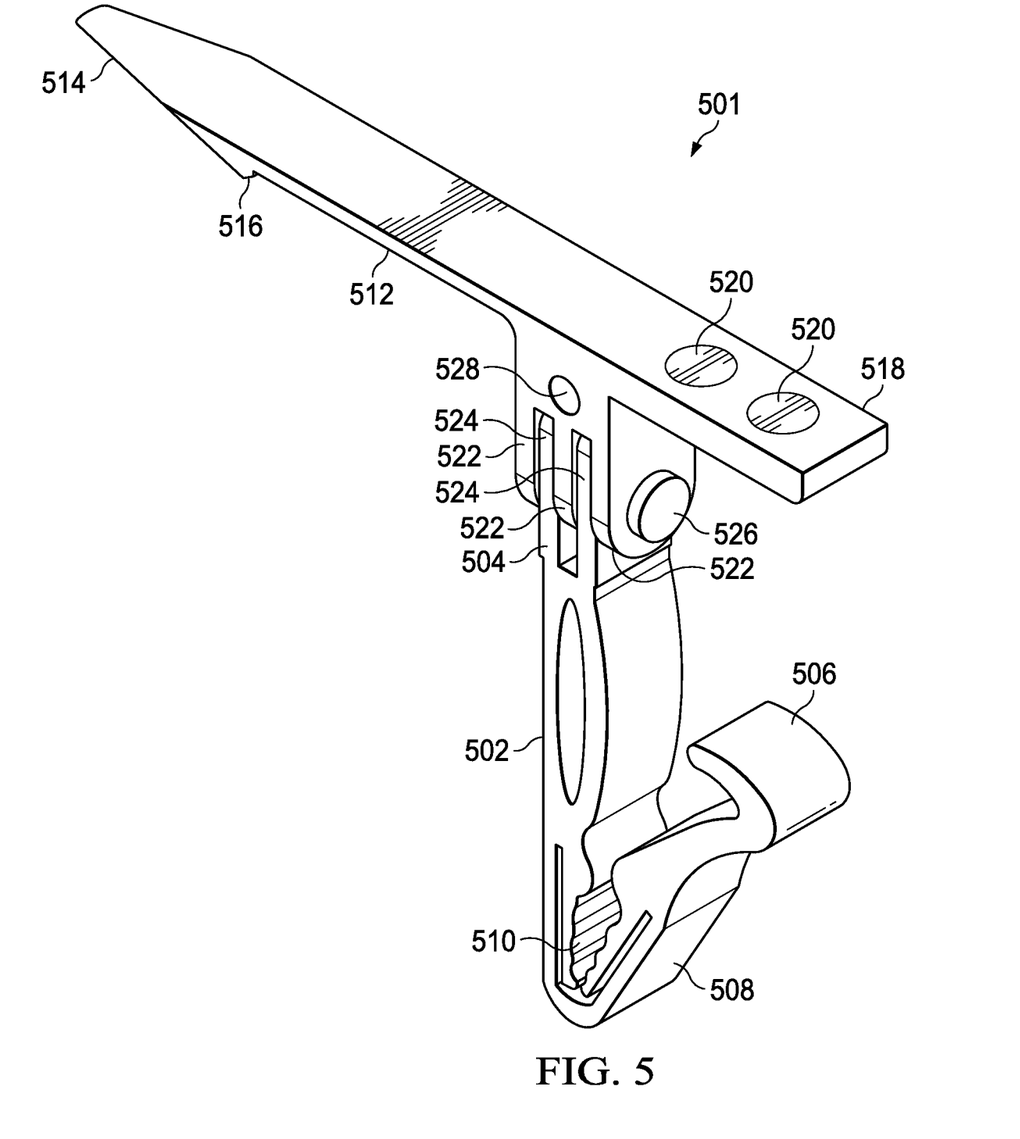
FIG. 5 is a perspective view of an alternate embodiment of a magnetic support clip configured to provide for rotational movement about the axis of a first pin (526)

Referring now to FIG. 5, a perspective view of an alternate embodiment of a magnetic support clip configured to provide for rotational movement about the axis of a first pin (526) is shown. Such an alternate embodiment, for reasons which will become more apparent in view of the description of the clip appearing below, is ideally suited for use in connection with homes without gutters or in connection with roof locations around a home where a gutter is not installed. In one alternate embodiment of a magnetic support clip (501) as depicted in FIG. 5, the clip comprises a lower portion (502) of the clip and an upper portion (512) of the clip. Adjacent to a proximal end (518) of the upper portion (512) of the clip, one or more magnets (520) are partially embedded (top side of magnets are exposed) and are positioned to be aligned with one or more magnets embedded in a clip mounting and removal apparatus of the type depicted in FIG. 8, allowing the clip to be more securely mounted within a hole formed in such apparatus (710). At a distal end (514) of the upper portion (512) of the clip, the clip shaft is tapered to facilitate the insertion of said distal end (514) into a space between the shingles of a roof adjacent to the roof eaves, between roof shingles and roof decking, or between any other space on a structure that will provide sufficient support for the clip and any objects which the clip in turn is used to support. In one embodiment, a protrusion (516) is formed on the underside of the clip shaft adjacent to the distal end (514), which works to better lodge the upper portion of the clip into the space in which it is inserted.

Still referring to FIG. 5, in one embodiment of the alternate embodiment of a magnetic support clip shown in FIG. 5, the upper portion (512) of the clip is fastened to the lower portion (502) of the clip by means of a pin (526) which is inserted between interlocking hinge-type knuckles (524) formed on the top end of the lower clip portion and hinge-type knuckles (522) formed on the bottom end of the upper clip portion. When the pin (526) is connected (via holes formed in the interlocking hinge knuckles), the upper and lower portions of the clip can rotate about the pin axis. In this manner, when the upper portion of the clip is inserted into the roof or other structure that may be angled, the lower portion may be rotated by a user or as a result of gravitation forces, into a desired orientation such as, for example, straight up and down. Similar to the embodiment of the clip shown in FIG. 1, the alternate embodiment of a clip shown in FIG. 5 also includes an upwardly facing "V" shaped notch or curved portion (510), open on the upper end and closed on the lower end, formed on the lower portion of the clip for securing a wire/string such as is typically utilized in connection with decorative lighting of the type depicted in FIG. 4. A lower end (506) of the lower portion of the clip may be curved to decrease the likelihood that the wire/string is inadvertently dislodged from the clip. A hole (528) is formed through and generally perpendicular to the upper portion of the clip, the purpose of such hole being more fully explained below with reference to FIG. 6.

Figure 6:
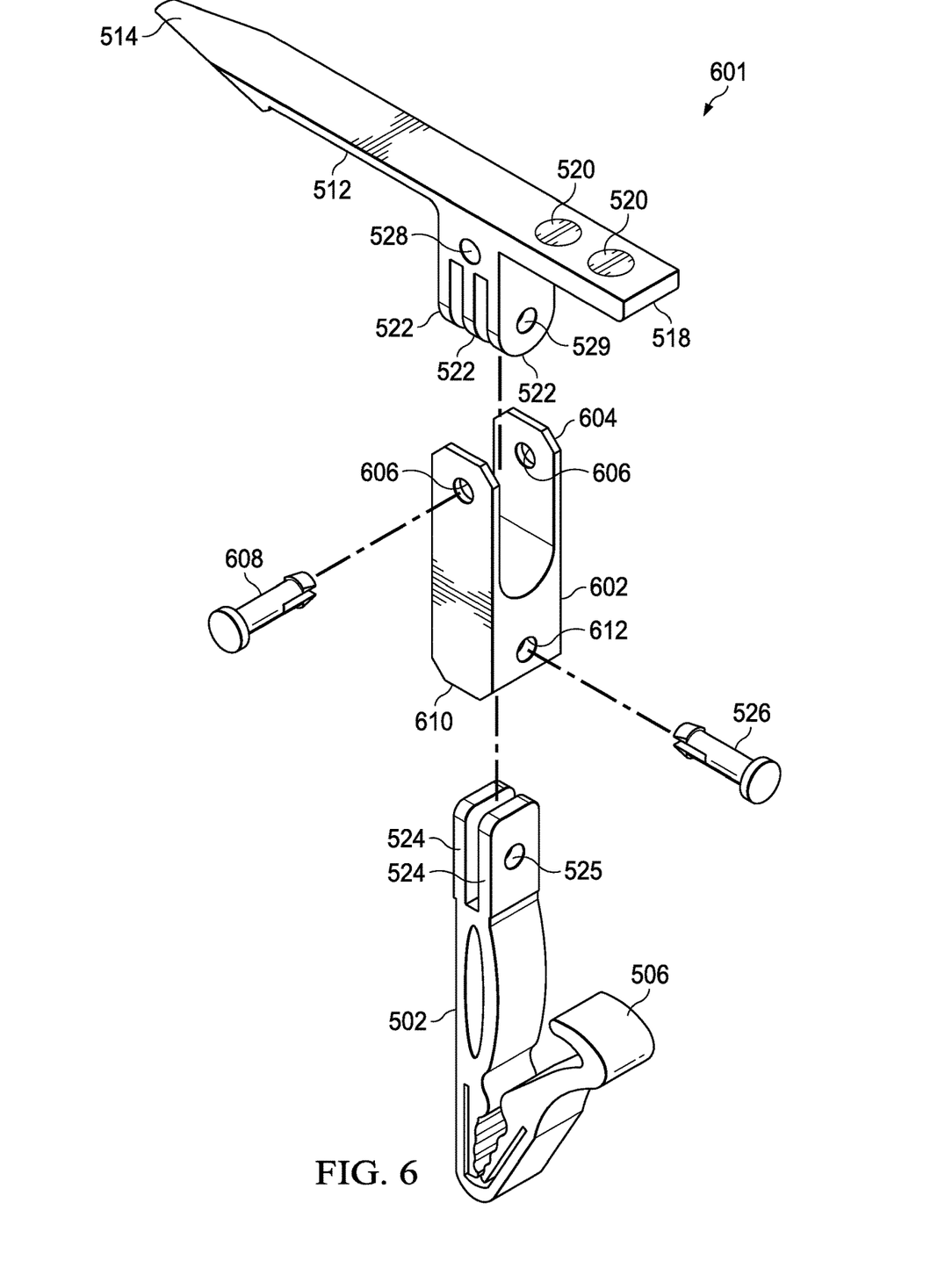
FIG. 6 is an exploded perspective view of the alternate embodiment of the magnetic support clip as depicted in FIG. 5, and further including a bracket configured for fastening to said clip to provide for rotational movement about the axis of a second pin (608)

Referring now to FIG. 6, an exploded perspective view of the alternate embodiment of the magnetic support clip as depicted in FIG. 5, and further including a bracket (602) configured for fastening to said clip (601) to provide for rotational movement about the axis of a second pin (608) is shown. When the clip previously described with reference to FIG. 5 is used in conjunction with the bracket (602), the lower portion (502) of the clip is capable of rotating about an axis formed by a second pin (608), while rotational movement with respect to the first pin (526) is arrested by the structure of the bracket which obstructs such rotational movement. In one embodiment, the knuckles (522) formed on the bottom of the upper portion of the clip are configured to slide within the upper walls of the bracket until such point as the holes (606) formed on such bracket are aligned with the hole (528) formed through and generally perpendicular to the upper portion (512) of the clip. The pin (608) may be inserted into such holes (606, 528) to attach the bracket to the upper portion of the clip, and to provide rotational movement about such pin. The knuckles (524) formed on the top of the lower portion of the clip are configured to slide within the lower walls of the bracket until such point as the holes (612) formed on such bracket are aligned with the holes (525) formed through the knuckles (524). In this alternate embodiment of the clip, the use of the bracket permits a user, when the upper portion of the clip is inserted into an angled roof, to rotate the lower portion of the clip in a distal or proximal direction with respect to the user until a desired angular orientation is achieved.

Figure 7:
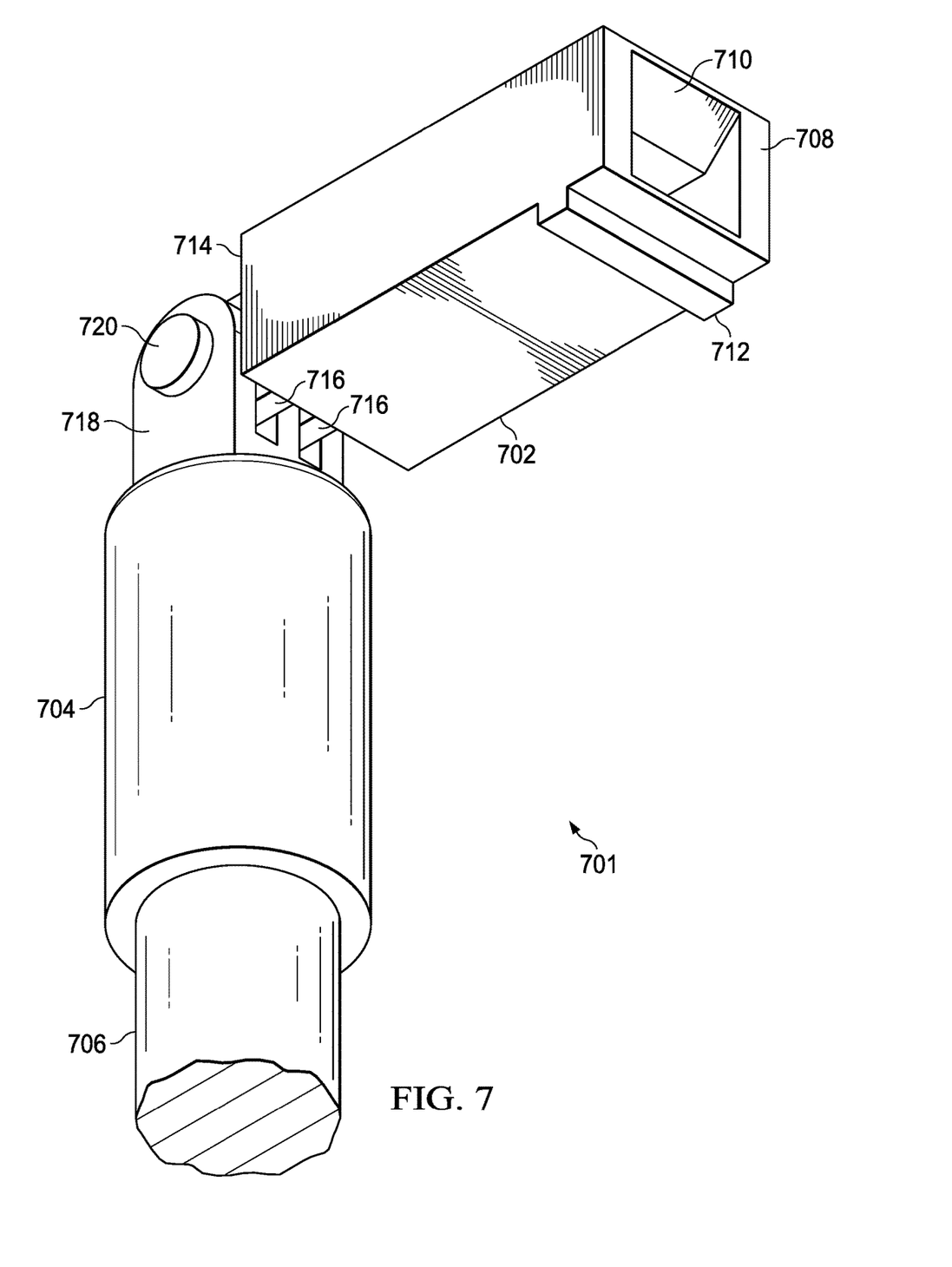
FIG. 7 is a perspective view of an embodiment of a clip mounting and removal apparatus intended for use in conjunction with magnetic support clips.
Figure 8:
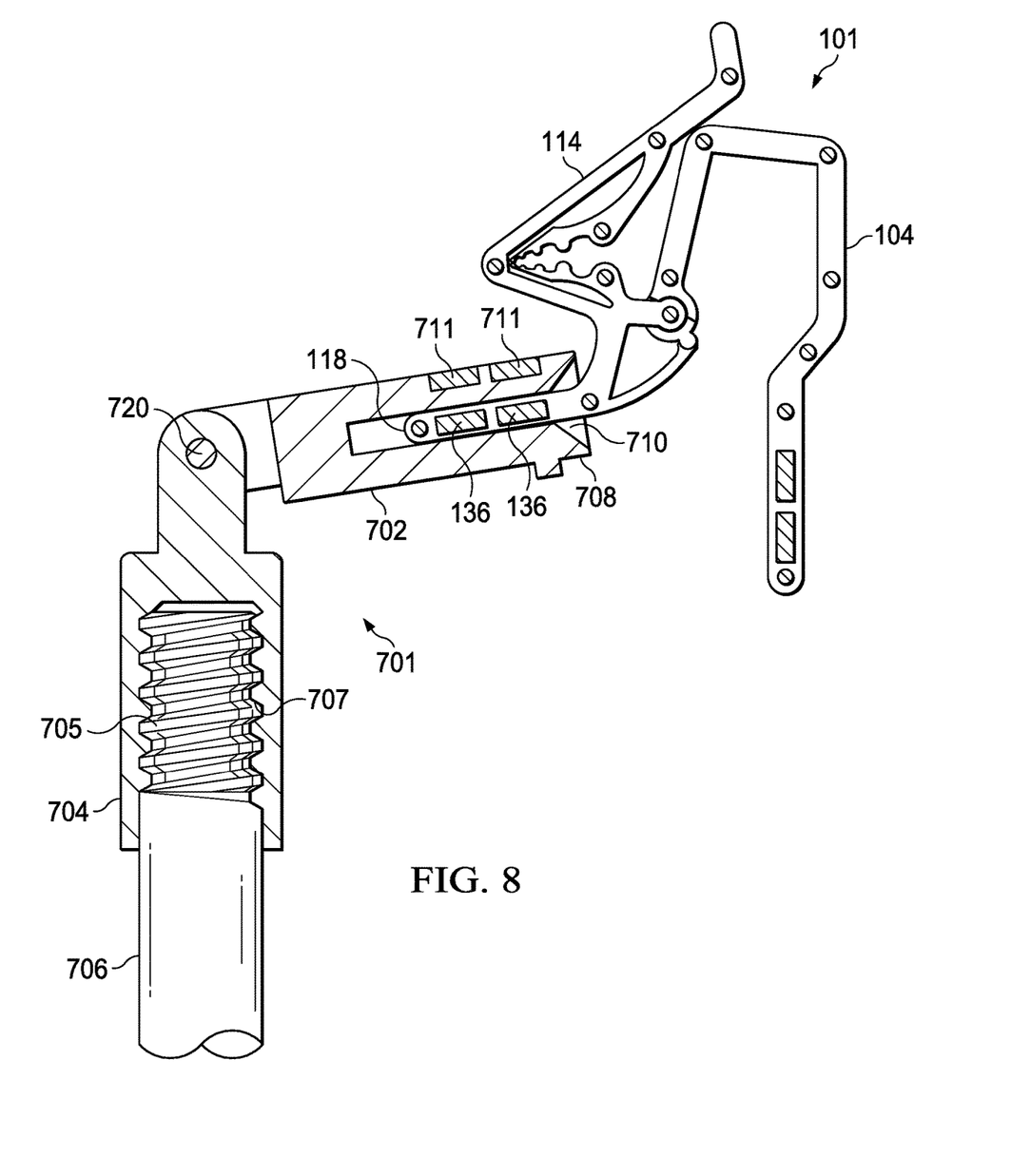
FIG. 8 is a cross-sectional view of the embodiment of the clip mounting and removal apparatus as depicted in FIG. 7, said apparatus being removably secured to an embodiment of the magnetic support clip as depicted in FIG. 1.
Figure 9:
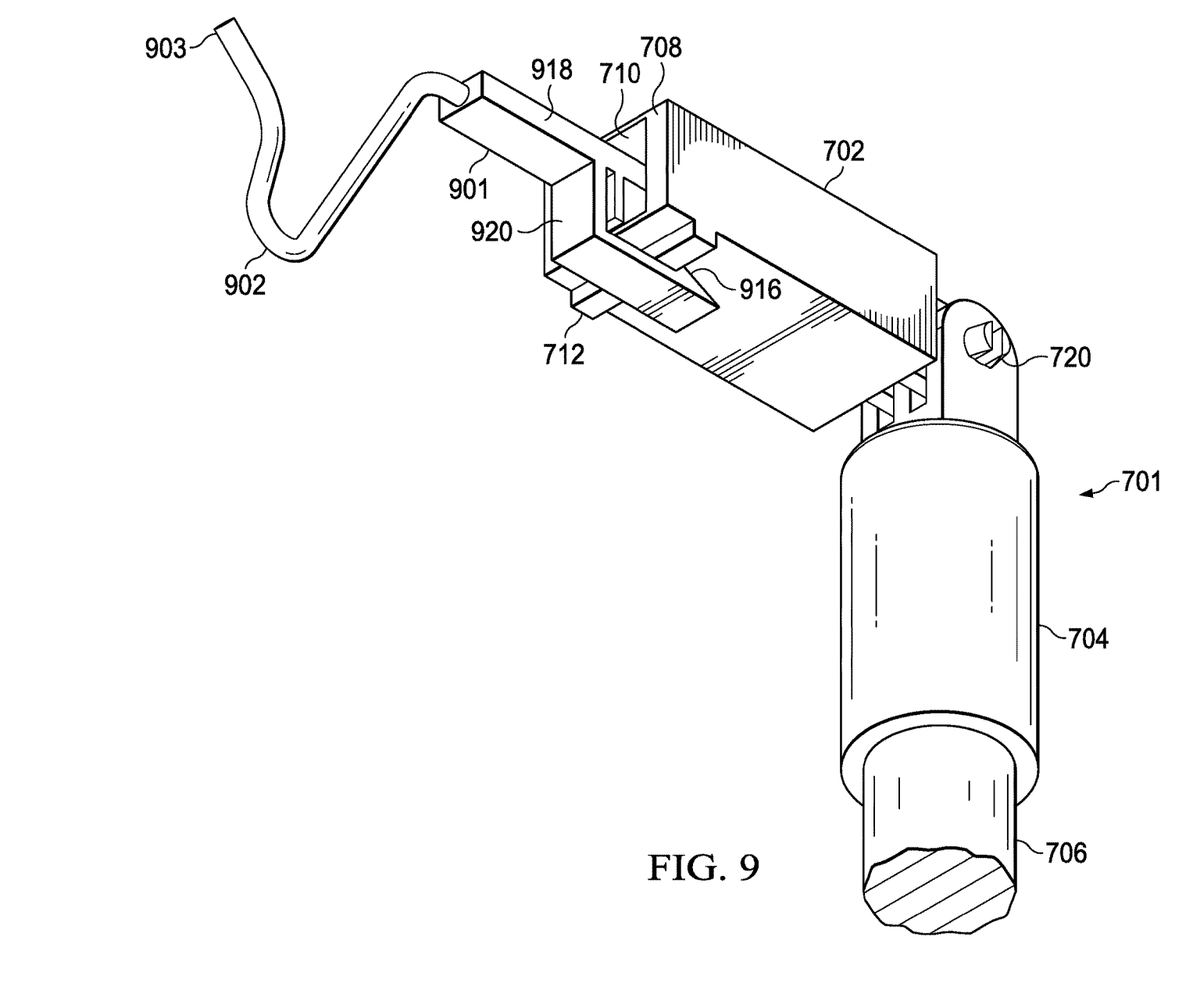
FIG. 9 is a perspective view of the clip mounting and removal apparatus as depicted in FIG. 7, said apparatus being removably secured to an embodiment of a lighting mounting and removal device.

Referring now to FIG. 7, a perspective view of an embodiment of a clip mounting and removal apparatus intended for use in conjunction with magnetic support clips is shown. An embodiment of the clip mounting and removal apparatus as depicted in FIG. 7 comprises an upper portion (702) which is configured to attach to an embodiment of a magnetic support clip as depicted in FIG. 8, or to attach to an embodiment of a lighting mounting and removal device as depicted in FIG. 9. The upper portion (702) of the clip mounting and removal apparatus in one embodiment has a hole (710) formed with an opening at the distal end (708), said hole being shaped and sized to receive and mate with a correspondingly sized and shaped shaft of a magnetic support clip or lighting mounting and removal device. A raised protrusion (712) on the exterior surface of the upper portion of the apparatus acts as a structure upon which a lighting mounting and removal device may engage as depicted in FIG. 9. A proximal end (714) of the upper portion (702) of the clip mounting and removal apparatus has hinge-like knuckles (716) formed thereon that are configured to attached to a pole attachment device (704) having corresponding knuckles which are joined with a pin (720), allowing for rotational movement about the pin. Such rotational movement of the upper portion (702) of the clip mounting and removal apparatus with respect to the pole attachment device (704), allows a user to orient such upper portion (702) of the clip mounting and removal apparatus to its most optimal position when mounting magnetic support clips on a gutter/roof, or removing them. An elongate pole (706) may be attached to the bottom of the pole attachment device (704). In one embodiment, the elongate pole (only partially visible in FIG. 7) may be of fixed length. In alternate embodiments, the elongate pole may be of variable length such as a telescoping collapsible pole, allowing a user to adjust the length of the pole as desired.

Referring now to FIG. 8, a cross-sectional view of the embodiment of the clip mounting and removal apparatus as depicted in FIG. 7, said apparatus being removably secured to an embodiment of the magnetic support clip as depicted in FIG. 1 is shown. In one embodiment, the hole (710) formed in the upper portion (702) of the clip mounting and removal apparatus is sized and shaped to receive the first lower end (118) of the proximal portion (114) of the magnetic support clip (101) of the type depicted in FIG. 1. In one embodiment, said first lower end of said proximal portion of said support clip includes a segment of said elongate shaft that is linear in form for a length of at least 1.0 inches. One or more magnets (711) may be embedded (partially or fully) or otherwise attached to the upper portion (702) of the clip mounting and removal apparatus such that they may be aligned with the one or more magnets (136) embedded in the proximal portion of the magnetic support clip. The attractive magnetic force between the aligned magnets works to further secure the clip inside the hole (710) of the upper portion (702) of the clip mounting and removal apparatus. When the clip is to be mounted to a gutter, the user may use the clip mounting and removal apparatus to raise the clip to the height of the gutter, and lower the distal portion of the clip inside the gutter until the top curved portion of the clip rests on the top of the gutter as shown in FIG. 1. The upper portion (702) of the clip mounting and removal apparatus may then be manipulated by the user to disengage the arched end (132) of the arm (130) from the rounded protrusion (128). The upper portion (702) of the clip mounting and removal apparatus may then be pulled in a proximal direction (towards the user and away from the gutter) until the magnetic attraction is overcome, allowing the first lower end (118) to dislodge from the hole (710). The lower end (118) of the clip may then be pushed to rotate towards the exterior of the gutter until it abuts the gutter wall and the magnets embedded within are in alignment with the magnets embedded in the distal portion of the clip. In order to remove a magnetic support clip, the upper portion (702) of the clip mounting and removal apparatus may be positioned by a user and forced to engage the second upper end (116) of the proximal portion of the clip. Once engaged, the user may manipulate the upper portion (702) of the clip mounting and removal apparatus to force the clip into an open mode of operation, allowing the clip to be removed from the gutter. In one embodiment, the pole attachment device may have a lower end that is hollow and have threaded walls (707) formed to engage with correspondingly threaded outer surface (705) of a pole (706).

Referring now to FIG. 9, a perspective view of the clip mounting and removal apparatus as depicted in FIG. 7, said apparatus being removably secured to an embodiment of a lighting mounting and removal device is shown. A proximal end (918) of lighting mounting and removal device is formed to be inserted into the hole (710) formed in the upper portion (702) of the clip mounting and removal apparatus (701). In one embodiment, a clip (920) having a tapered end (916) is formed to engage the protrusion (712) formed on the bottom of the upper portion (702) of the clip mounting and removal apparatus, providing a means to lock the lighting mounting and removal device into place. A user may lift the tapered end (916) away from the protrusion (712) to remove the lighting mounting and removal device from the clip mounting and removal apparatus when desired. In one embodiment, a wire loop is formed on the distal end of the lighting mounting and removal device, said loop having an upwardly facing notch (902) on which a wire/string may rest when mounting or removing such wire/string onto or from the magnetic support clips described herein.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes that come within the meaning and range of equivalency of the claims are embraced therein. Further, the recitation of method steps does not denote a particular sequence for execution of the steps. Such method steps may therefore be performed in a sequence other than that recited unless the particular claim expressly states otherwise.

I claim:

1. A support clip comprising:
    a distal clip portion having a first elongate shaft with a curved section that is downwardly facing, one or more first magnets affixed to said distal clip portion;
    a proximal clip portion having a second elongate shaft with a curved section that is upwardly facing, one or more second magnets affixed to said proximal clip portion;
    wherein said distal clip portion and said proximal clip portion are rotatably fastened to one another, allowing said distal clip portion and said proximal clip portion of said support clip to rotate with respect to one another such that in a closed mode of operation of said support clip, said one or more first magnets are in alignment with said one or more second magnets.

2. The support clip of claim 1, further comprising a hollow portion formed on said distal clip portion, and further comprising a pin formed on said proximal clip portion, wherein said pin is configured to mate with said hollow portion to form a hinge.

3. The support clip of claim 1, further comprising an arm extending from said proximal clip portion, said arm having an arched end.

4. The support clip of claim 3, further comprising a rounded protrusion formed on said second end of said distal clip portion.

5. The support clip of claim 4, wherein rotational movement of said distal clip portion with respect to said proximal clip portion allows said rounded protrusion formed on said second end of said distal clip portion to mate with said arched end formed on said arm, wherein such mating arrests all rotational movement of said distal clip portion with respect to said proximal clip portion.

6. The support clip of claim 1, wherein said one or more first magnets are at least partially embedded in said distal clip portion, and wherein said one or more second magnets are at least partially embedded in said proximal clip portion.

7. The support clip of claim 1, wherein a lower end of said proximal clip portion includes a segment of said second elongate shaft that is linear in form for a length of at least 1.0 inches.

8. The support clip of claim 1, wherein an upper end of said proximal clip portion includes a segment of said second elongate shaft that is linear in form for a length of at least 0.5 inches.

9. A support clip comprising:
    a distal clip portion having a first elongate shaft with a curved top portion formed between a first lower end of said distal clip portion extending downward from a distal end of said curved top portion, and a second end of said distal clip portion extending from a proximal end of said curved top portion, one or more first magnets affixed to said distal clip portion adjacent to said first lower end of said distal clip portion;

a proximal clip portion having a second elongate shaft with a first lower end, a second end of said proximal clip portion, and an upwardly facing notch formed between said first lower end of said proximal clip portion and said second end of said proximal clip portion, one or more second magnets affixed to said proximal clip portion adjacent to said first lower end of said proximal clip portion;

wherein said distal clip portion and said proximal clip portion are rotatably fastened to one another, allowing said distal clip portion and said proximal clip portion of said support clip to rotate with respect to one another such that in a closed mode of operation of said support clip, said one or more first magnets are in alignment with said one or more second magnets.

10. The support clip of claim 9, further comprising a hollow portion formed on said distal clip portion, and further comprising a pin formed on said proximal clip portion, wherein said pin is configured to mate with said hollow portion to form a hinge.

11. The support clip of claim 9, further comprising an arm extending from said proximal clip portion, said arm having an arched end.

12. The support clip of claim 11, further comprising a rounded protrusion formed on said second end of said distal clip portion.

13. The support clip of claim 12, wherein rotational movement of said distal clip portion with respect to said proximal clip portion allows said rounded protrusion formed on said second end of said distal clip portion to mate with said arched end formed on said arm, wherein such mating arrests all rotational movement of said distal clip portion with respect to said proximal clip portion.

14. The support clip of claim 9, wherein said one or more first magnets are at least partially embedded in said distal clip portion, and wherein said one or more second magnets are at least partially embedded in said proximal clip portion.

15. The support clip of claim 9, wherein said upwardly facing notch has a ridged exterior surface.

16. The support clip of claim 9, wherein said first lower end of said proximal clip portion includes a segment of said second elongate shaft that is linear in form for a length of at least 1.0 inches.

17. The support clip of claim 9, wherein said second end of said proximal clip portion includes a segment of said second elongate shaft that is linear in form for a length of at least 0.5 inches.

18. The support clip of claim 9, wherein said curved top portion of said distal clip portion comprises a substantially linear segment configured for mounting on a top of a gutter.

* * * * *